March 11, 1947. J. J. SPIRA 2,417,382

VEHICLE WHEEL

Filed June 10, 1943

INVENTOR
*Jacob J. Spira*
BY
*O. Z. McCoy*
ATTORNEY

Patented Mar. 11, 1947

2,417,382

UNITED STATES PATENT OFFICE 2,417,382

VEHICLE WHEEL

Jacob J. Spira, Cleveland, Ohio, assignor of two-thirds to Samuel O. Siegel and Edward I. Siegel, Cleveland, Ohio Application June 10, 1943, Serial No. 490,232

9 Claims. (Cl. 152—16)

This invention relates to vehicle traction wheels for use in heavy duty, warfare, and the like, and particularly to a wheel having a resilient metal tire.

The objects of the present invention include the provision of an improved rugged metal wheel having resilient properties and that is built of simply designed and strong parts that are capable of prolonged service under rigorous treatment without such arresting of their functions as to impair the continued use of the wheel short of its actual destruction. Provision is made for the rapid removal and the replacement of an exposed part of the wheel that may be injured by impact, shell fire, or the like, that may exceed the mechanical strength of the material of which the part is made, thereby minimizing the probability of the loss of a vehicle equipped with wheels that embody the present invention thru the mechanical failure of the wheels that support the vehicle.

With the above and other objects in view, that will be apparent to those who are skilled in the art to which the present invention belongs from the following description, an illustrative embodiment of the present invention is disclosed in the accompanying drawing, wherein.

Figure 1:
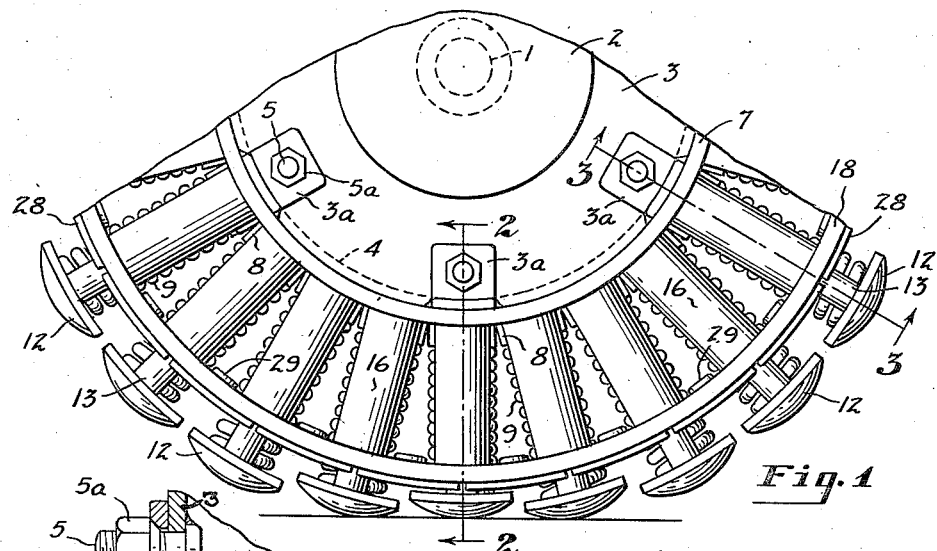
Fig. 1 is a fragmentary elevation of a portion of a wheel that embodies the invention that is disclosed herein, with parts broken away.

The wheel that is shown in the accompanying drawing is journaled upon the axle 1 and comprises a wheel hub 2, a disc 3, and an axially extending flange 4 at the peripheral edge of the disc 3 to provide a wheel rim. A resilient tire is shown as being removably mounted upon the wheel disc flange 4, or it may be a permanent part of the wheel, if preferred. In the construction shown, a plurality of bolts 5 are disposed in the disc 3 radially inwardly of the flange 4. Lugs 5a are removably mounted upon the threaded ends of the bolts 5 for engaging the angle irons 3a to secure the tire upon the wheel rim. The bolts 5 are preferably secured to the wheel by having their heads welded to the disc 3, or the like. The angle irons 3a are welded to the tire inner rim 6. In mounting the resilient tire upon the wheel, the tire inner rim 6 is placed upon the radially outer face of the wheel disc flange 4 and advanced axially thereon, with the bolt holes in the angle irons 3a in alignment with the shafts of the bolts 5, until the angle irons 3a contact the wheel rim disc 3. The tire is secured in this position by the tightening of the wheel lugs 5a.

The tire inner rim 6 is continuous circumferentially of the wheel tire and preferably terminates axially at each edge thereof in a radially outwardly extending flange 7. A pintle 8, that is preferably altho not necessarily hollow, is disposed midway between the axial edges of the inner rim 6 and is secured thereto in any desired manner, as by being welded thereto or the like. The radially inner end of the main spring 9 rests upon the pintle 8 and is maintained in position thereon in any desired manner, as by a centrally disposed riser therein, such as a tube 10 that is disposed within the bore of the spring 9 and that extends longitudinally thereof a desired distance for centering and supporting the radially inner end of the spring 9. The riser or tube 10 is rigid with respect to the pintle 8, as by being welded to or press fit inside of the pintle 8 and may be welded to the inner rim 6 also as shown, if preferred.

Figures 2, 3:
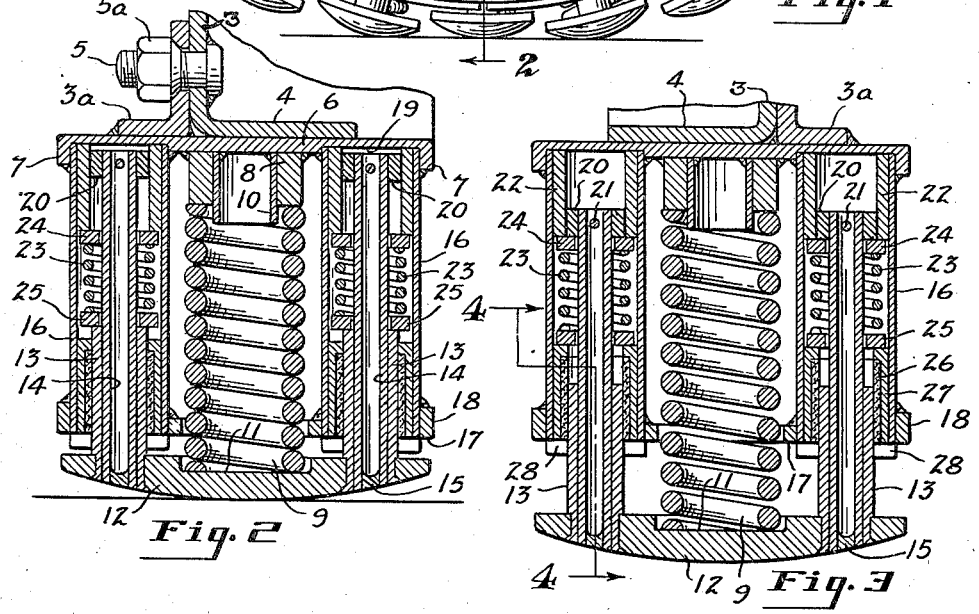
Fig. 2 is an enlarged fragmentary elevational section taken along the line 2—2 of Fig. 1, showing a tire unit under load.
Fig. 3 is an enlarged fragmentary section taken along the line 3—3 of Fig. 1, showing a tire unit not under load.
Figures 4, 5:
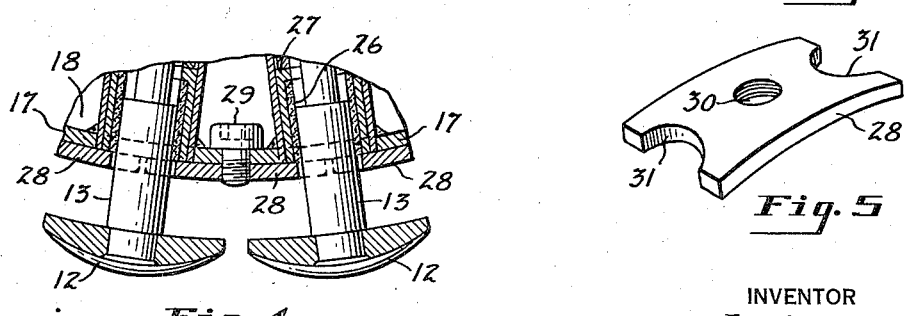
Fig. 4 is an enlarged fragmentary section taken along the line 4—4 of Fig. 3.
Fig. 5 is an enlarged perspective view of a clamp bar that is a part of the tire assembly.

The radially outer end of the main spring 9 is secured in position centrally of a tread member 12 in any desired manner, as by means of a repetition of the pintle 8 and riser or tube 10, if preferred, but preferably is disposed within a depression 11 in the radially inner face of the tread member 12 as shown. The radially outer face of the tread member 12 is adapted for engaging the roadway and may have any desired pattern or design thereon. The main spring 9 resiliently supports the vehicle by exerting its expansive force between the tread member 12 and the tire inner rim 6 and serves as a supporting thrust member when collapsed or when the spring coils are in engagement with each other thruout the length of the spring 9 as shown in Fig. 2. The tread members 12 are preferably of a suitable tough steel and may be cast, forged, pressed or machined as preferred. The functional operation of the present device will not be altered by vulcanizing any desired thickness of rubber, not shown, upon the road engaging face of the tread members 12, where such an addition to the construction is desired for a particular use.

The tread members 12 are maintained in radially yieldingly resilient movable relation with respect to the tire inner rim 6 and are maintained in substantially immovable circumferential and axial relation with respect to the tire inner rim 6 by suitable means, such as by the outer journal guide pins 13 and the inner guide pins 14 that slide radially within the tubes 16.

The guide pins 13 and 14 are disclosed as hollow tubes in the interests of minimizing the weight of the device altho a machined solid bar stock of different outside diameter may be utilized in place of guide pins 13 and 14 where the matter of weight is not of importance. As shown, the outer end of each of the inner guide pins 14 is closed against the admission of dirt or gravel in any desired manner, as by means of a plug 15 that is welded therein. The outer end of each tube 16 preferably is disposed within an aperture in the outer rim 17 adjacent the flange 18, and may be secured thereto in any desired manner, as by being welded thereto or the like.

The inner end of each tube 16 is secured in any desired manner to the inner rim 6, as by being housed within a depression 19 therein adjacent the flange 7, and preferably is secured thereto by being welded thereto, or the like. The depression 19 may be of any desired depth to provide a desired support against torque forces between tubes 16 and the radially inner rim 6 and may be press fitted therein or may be welded thereto as preferred.

Each of the inner guide pins 14 has a journal ring 20 secured to its radially inner end by suitable means, such as the taper pin 21 or the like, to provide a bearing surface for the inner guide pin 14 that engages a suitable bushing 22 that is press fit, sweated, or otherwise immovably mounted within each tube 16. The bushing 22 extends radially outwardly from the inner end of the tube 16 for a suitable distance to accommodate the reciprocating movement of the inner guide pin 14 with respect to the tube 16. An auxiliary spring 23 is arranged in each tube 16 which may function either as a snubber or shock absorbing spring or as a recoil or restraining spring although when the load is excessive, the auxiliary springs are compressed as shown in Fig. 2 and serve to bear a small portion of the load. However, when the tread is disengaged from the road, auxiliary springs 23 expand and serve to maintain rings 25 in engagement with bushings 27 in which position they serve to oppose further outward movement of the main spring 9 and tread 12.

The outer guide pin 13 makes radially directed sliding engagement with a bushing 26 that, together with the radially outer bushing support 27, is press fitted, sweated or otherwise secured within the radially outer end of the tube 16. The bushing 26 and its support 27 may be replaced by a single piece bushing, such as the radially inner bushing 22, if preferred, without alteration in the inventive concept of the present device. The bushings 22 and 26 are preferably of the oilless type, such as those made of "Mechanite," "Oillite," or similar material.

The assembly is secured together by suitable means, such as a plurality of clamp bars 28 that overlie the outer ends of the tubes 16 and the bushing 26 and its support 27, and fit closely against the outer journal guide pin 13 to minimize the entrance of dust between the guide pins 13 and the bushing 26. The clamp bars 28 are removably held in position by suitable means, such as the "Allen" cap screws 29 that pass thru openings in the outer rim 17 and thread into openings 30 that are disposed centrally of the clamp bars 28. Each clamp bar 28 has a semi-circular slot 31 at each of its ends so that the ends of adjacent pairs of clamp bars are disposed snugly against the opposite sides of the outer guide pins 13. The removal of the "Allen" cap screws 29 permit the quick and easy disassembly of any desired number of units of the wheel tire for the purpose of replacing injured members, or the like.

The method of removing units may be readily ascertained from Figs. 2 and 3 of the drawings. Assuming, for instance, that bushings 27 are inserted in their respective tubes 16 with a press fit and are maintained in position by clamps 28 during normal operation, when clamps 28 are removed and sufficient outward force is applied to the tread 12, bushings 27, bushing supports 26, guide pins 13 and 14, auxiliary springs 23 and main spring 9 may be readily removed and if any portions are broken or damaged, they may be readily replaced and the parts easily reassembled.

It will also be apparent that the wheel may be easily removed from the inner flange 4. This may be effected by removing the lugs or nuts 5a from bolts 5 and sliding the wheel axially to clear the flange 4.

From the drawings, it will be noted that the outer surface of each of the treads 12 is convex in shape providing a central bearing surface opposite main spring 9 with the tread being of an arcuate shape from the central portion toward its outer and inner edges and also forwardly and rearwardly therefrom. From Fig. 1 of the drawing, it will also be noted that the forwardly and rearwardly arcuate-shaped portions of the tread have a greater degree of curvature than the outer rim. It will also be apparent that guide pins 13 do not engage rings 25 to compress auxiliary springs 23 until the main spring 9 has been compressed to a considerable extent by the load. The load of the vehicle will therefore be borne principally by the main springs 9 of the particular units which engage the road bed at any particular time. When the load, however, is excessive, guide pins 13 engage rings 25 and compress auxiliary springs 23 in which case they bear a small portion of the load.

As illustrated, the units are uniformly spaced apart at such distance from each other that when the main spring of one unit is vertical to the road bed, the tread of the preceding unit has substantially all of its rearwardly arcuate-shaped portion engaging the road bed and the tread of the following unit has substantially all of its forwardly arcuate-shaped portion engaging the road bed. It will thus be seen that three of the treads engage the road bed at one time and carry the load for which the wheel is designed and that when the main spring of the center unit of the three road-engaging treads is vertical to the road, it will bear the main portion of the load and the main spring of each of the two adjacent treads will be inclined at an acute angle to the road and each will bear a portion of the load. As the wheel rotates, it will also be apparent that as one unit leaves the road, another unit comes in contact with the road to assume its portion of the load which increases until the main spring is vertical with the road and then gradually decreases until it leaves the road and because of the shape of the treads, during forward travel of the vehicle, each tread first engages the road over its forwardly arcuate-shaped portion, then over the central portion of the tread, and finally over its rearwardly arcuate-shaped portion so that each tread in effect rocks on the road bed.

As previously stated, the main weight of the load is borne by the main spring 9 which is vertical to the road and by the two adjacent main springs 9 which are inclined at an acute angle to the road, and while auxiliary springs 23 of each unit bear a small portion of the load after the main spring has been compressed to a predetermined extent, their chief function is to absorb the shock caused by a too rapid collapse of the main spring 9 under heavy load.

Auxiliary springs 23 also serve to prevent excessive outward movement of the tread by centrifugal force when the units are disengaged from the road and in such case act as recoil or restraining springs. When the units leave the road bed, main spring 9 forces the guide pins outwardly as shown in Fig. 3 of the drawings and rings 25 engage bushings 27 and the journal rings 20 engage rings 24, thereby permitting expansion of the auxiliary springs to the extent that they have been compressed by the load. When the auxiliary springs are in this position, it will therefore be apparent that they oppose any further outward force of the main springs 9 and this opposing force increases as the speed of the vehicle increases because guide pins 14 are attached to the tread and any outward movement of the tread by centrifugal force will compress auxiliary springs 23 to resiliently resist further outward movement of the tread.

It is to be understood that the constructions of the device and of the individual parts thereof, that are disclosed herein and that are shown in the drawing, are submitted for the purposes of description and illustration of one embodiment of the invention and that various modifications may be made therein without departing from the invention as defined by the appended claims.

What I claim is:

1. A vehicle wheel having a rim and a plurality of spaced units, each unit comprising a tread arranged outwardly from said rim and being compressible by the load of said vehicle when the tread engages the road, a main spring disposed between said rim and tread for assuming the main portion of the load when the tread engages the road, a pair of guides arranged on opposite sides of the main spring, each having one end affixed to and extending radially inwardly from said tread, and resilient means associated with said rim and each of said guides for limiting the outward movement of said tread when it is disengaged from a road.

2. A vehicle wheel having a rim and a plurality of units, each unit comprising a tread arranged outwardly from said rim, a main spring disposed centrally between said rim and tread, a pair of guide means, each having an end affixed to opposite sides of said tread and extending radially inwardly therefrom, a pair of auxiliary springs associated with said rim and arranged on opposite sides of the main spring, each of which is associated with one of said guide means, and said main spring being compressible to a sufficient extent to assume the main portion of the load of said vehicle and said guide means being movable radially inwardly when said tread engages the road and being shaped to permit inward movement of the guide means independently of said auxiliary springs until the main spring assumes the main portion of the load and to finally engage and compress said auxiliary springs to cause them to assume a portion of the load and to prevent a too sudden collapse of the main spring.

3. A vehicle wheel having a rim and a plurality of units, each unit comprising a tread arranged outwardly from said rim, a main spring disposed centrally between said rim and tread, a pair of guide means affixed to opposite sides of said tread and extending radially inwardly therefrom, means including a pair of auxiliary springs associated with said rim and guide means and arranged on opposite sides of the main spring for resiliently limiting the outward movement of said tread when it is disengaged from a road and said main spring being compressible to a sufficient extent to assume the main portion of the load of said vehicle and said guide means being movable radially inwardly when said tread engages the road and being shaped to permit of their inward movement independently of the auxiliary springs until the main spring assumes the main portion of the load and to finally engage and compress said auxiliary springs to cause the auxiliary springs to assume a portion of the load to thereby prevent a too sudden collapse of the main spring.

4. A vehicle wheel having a rim and a plurality of units, each unit comprising a tread arranged outwardly from said rim, a main spring interposed between said rim and said tread, a pair of tubes extending radially outwardly from said rim and arranged on opposite sides of said spring, an auxiliary spring arranged in each of said tubes, a pair of spaced guide means affixed to and extending radially inwardly from the opposite sides of said tread and each being movable in one of said tubes, means associated with said guide means and said tubes for compressing the auxiliary springs to limit outward movement of said tread when the tread is disengaged from a road and said main spring being compressible to a sufficient extent when the tread engages a road to assume the main portion of said load and to move said guide means radially inwardly in said tubes and each of said guide means being shaped to permit their inward movement in said tubes independently of the auxiliary springs until the main spring assumes the main portion of the load and to prevent a too sudden collapse of the main spring.

5. A vehicle wheel having an inner rim, an outer rim, and a plurality of units associated with said rims, each unit including a tread, a main spring interposed between said tread and the inner rim, a pair of tubes arranged on opposite sides of the main spring, each having its inner end affixed to the inner rim and its outer end affixed to the outer rim, a pair of spaced guide means affixed to and extending radially inwardly from opposite sides of said tread and each being movable in one of said tubes, means associated with said guide means and said tubes for compressing the auxiliary springs to limit outward movement of said tread when the tread is disengaged from a road, and said main spring being compressible to a sufficient extent to assume the main portion of said load and said guide means being movable radially inwardly in said tubes when the tread engages a road, and each of said guide means being shaped to permit its inward movement in one of said tubes independent of the auxiliary spring therein until the main spring assumes the main portion of the load and to finally engage and compress said auxiliary spring to cause the auxiliary springs to assume a portion of the load and to prevent a too sudden collapse of the main spring.

6. A vehicle wheel having an inner rim, an outer rim, and a plurality of units, each unit including a tread, a main spring interposed between said tread and the inner rim and being compressible by the load of said vehicle when the tread engages the road, a pair of tubes arranged on opposite sides of the main spring, each having its inner end affixed to the inner rim and its outer end affixed to the outer rim, a pair of spaced guides, each having one end fixed to and extending radially inwardly from said tread and each being movable in one of said tubes, means including a bushing arranged with a press fit in the outer end of each of said tubes, an auxiliary spring arranged in each of said tubes, means associated with each of said guide means and said bushing for compressing said auxiliary springs to limit the outward movement of said tread when it is disengaged from the road, and clamping means affixed to the outer surface of the outer rim and having portions engaging the bushings in the tubes of two adjacent units for preventing outward movement of said bushings.

7. A vehicle wheel having an inner rim, an outer rim, and a plurality of units, each unit including a tread and a main spring interposed between said tread and the inner rim and being compressible by the load of the vehicle when the tread engages the road, means providing cylindrical openings arranged on opposite sides of the main spring, a pair of spaced guides, each having one end affixed to and extending radially inwardly from said tread, and one of said guides being movable in one of said openings and the other being movable in the other opening, and means for preventing withdrawal of said guides from said openings including clamping means affixed to the outer surface of the outer rim and having portions arranged over the two adjacent openings of two units.

8. A vehicle wheel having an inner rim and an outer rim and a plurality of units, each unit including a tread, a main spring interposed between said tread and the inner rim and being compressible by the load of the vehicle when the tread engages the road to assume at least the main portion of the load, a pair of metallic tubes arranged on opposite sides of the main spring, each having its inner end affixed to the inner rim and its outer end affixed to the outer rim, a pair of spaced guides, each having one end affixed to and extending radially inwardly from said tread and one of said guides being movable in one of said tubes and the other guide being movable in the other tube, said main spring being of greater diameter than said tubes and having exposed portions between the inner and outer rims, and a plurality of means associated with the outer rim of said wheel, each of which has portions arranged over the outer orifices of the adjacent tubes of two units for preventing withdrawal of said guides from said tubes.

9. A vehicle wheel having an annular rim and a plurality of units, each of said units having a tread arranged outwardly from said rim and a main spring arranged between each tread and said rim, means providing cylindrical openings arranged on opposite sides of the main spring, a pair of spaced guides, each having one end affixed to and extending radially inwardly from said tread, and one of said guides being movable in one of said openings and the other guide being movable in the other opening, and each of said treads including a central portion and rearwardly and forwardly arcuate-shaped portions, each of which arcuate-shaped portions has a greater degree of curvature than the curvature of said rim, said treads being uniformly spaced apart and arranged at such distance from each other that the entire load of the vehicle is supported by three of said treads on each wheel, and the curvature of said arcuate-shaped portions being such that when the central portion of the tread of one unit bears upon the road with its main spring vertical to the road, it supports the main portion of the load borne by the wheel and the main spring of the two adjacent units support portions of the load borne by the same wheel and are arranged at an acute angle to the road with the tread of the preceding unit having substantially all of its arcuate-shaped portion engaging the road and the tread of the following unit having substantially all of its forwardly arcuate-shaped portion engaging the road.

JACOB J. SPIRA.

REFERENCES CITED

The following references are of record in the file of this patent:

UNITED STATES PATENTS

| Number | Name | Date |
|---|---|---|
| 899,139 | Smith | Sept. 22, 1908 |
| 1,290,113 | Deisenhofer | Jan. 7, 1919 |
| 1,138,813 | Vickery | May 11, 1915 |
| 1,343,898 | Beach | June 22, 1920 |
| 2,019,068 | Bowers | Oct. 29, 1935 |
| 1,556,620 | Murrey | Oct. 12, 1915 |